United States Patent [19]

Condon

[11] 4,177,184

[45] Dec. 4, 1979

[54] POLYMERIC BLEND FOR AUTOMOTIVE APPLICATIONS

[75] Inventor: Nancy J. Condon, Missouri City, Tex.

[73] Assignee: Shell Oil Company, Houston, Tex.

[21] Appl. No.: 918,755

[22] Filed: Jun. 26, 1978

[51] Int. Cl.² ............................................. C08K 5/20
[52] U.S. Cl. ...................... 260/32.6 A; 260/32.6 PQ; 260/42.46; 260/42.47
[58] Field of Search .................. 260/32.6 A, 32.6 PQ, 260/42.46, 42.47, 876 B

[56] References Cited

U.S. PATENT DOCUMENTS

| | | | |
|---|---|---|---|
| 3,330,796 | 7/1967 | Mack et al. | 260/32.6 PQ |
| 3,515,528 | 6/1970 | Luther et al. | 260/32.6 A |
| 3,850,474 | 11/1974 | Welch | 296/31 P |
| 4,038,237 | 7/1977 | Snyder | 260/42.46 |
| 4,081,424 | 2/1978 | Gergen et al. | 260/42.47 |
| 4,101,482 | 7/1978 | Doss et al. | 260/42.47 |
| 4,107,131 | 8/1978 | Gergen et al. | 260/42.47 |

FOREIGN PATENT DOCUMENTS 1159636  12/1963  Fed. Rep. of Germany ... 260/32.6 PQ

*Primary Examiner*—Lewis T. Jacobs
*Attorney, Agent, or Firm*—Dean F. Vance

[57] ABSTRACT

Polymeric blends having utility for use as automotive exterior parts and the like comprise a selectively hydrogenated monoalkenyl arene/diene multi-block copolymer, polyolefin, filler, fatty acid amide and a synthetic rubberizing polymer. The resulting blends not only have excellent mold release characteristics but are also paintable, printable and metallizable.

10 Claims, No Drawings

POLYMERIC BLEND FOR AUTOMOTIVE APPLICATIONS

BACKGROUND OF THE INVENTION

The present energy crisis is having a profound effect upon the automotive industry. Because of increasing gasoline costs and increasing government pressure, new cars are becoming smaller and lighter in weight. One means of reducing weight is by replacing more of the metal parts with lighter weight plastic parts, such as with the plastic parts disclosed in Welch, U.S. Pat. No. 3,850,474. A continued problem with these prior art polymer blends for use in automotive parts is that the blends do not possess all of the desired property advantages. The desired polymer blend must not only have good impact strength and mar resistance, it must also possess good mold release characteristics and good paint adhesion. In the past, good mold release properties could not always be attained along with good paint adhesion. The present polymer blend, however, does possess these two dissimilar property advantages.

SUMMARY OF THE INVENTION

The present invention comprises a polymeric blend useful for automotive parts and having good impact, mold release, and paint adhesion properties. The various components of the polymer blend include:
(a) 100 parts by weight of a selectively hydrogenated monoalkenyl arene-conjugated diene multiblock copolymer;
(b) 5 to 200 parts by weight of a polymeric alpha-olefin;
(c) 5 to 200 parts by weight of a filler;
(d) 5 to 200 parts by weight of a synthetic rubberizing polymer; and
(e) 0.05 to about 15.0 parts by weight of a fatty acid amide.

DETAILED DESCRIPTION OF THE INVENTION

The multiblock copolymer referred to above and in the claims is a block copolymer having at least two polymer end blocks A and at least one mid block B. The multiblock copolymers employed in the present invention may have a variety of geometrical structures, since the invention does not depend on any specific geometrical structure, but rather upon the chemical constitution of each of the polymer blocks. Thus, the structures may be linear, radial or branches so long as each copolymer has at least two polymer end blocks A and at least one polymer mid block B as defined below. Methods for the preparation of such polymers are known in the art. Particular reference will be made to the use of lithium based catalysts and especially lithiumalkyls for the preparation of the precursor polymers (polymers before hydrogenation). U.S. Pat. No. 3,595,942 not only describes some of the polymers of the instant invention but also describes suitable methods for their hydrogenation. The structure of the polymers is determined by their methods of polymerization. For example, linear polymers result by sequential introduction of the desired monomers into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the precursor polymers of three or more. Coupling may be effected with multifunctional coupling agents such as dihaloalkanes or -alkenes and divinyl benzene as well as certain polar compounds such as silicon halides, siloxanes or esters of monohydric alcohols with carboxylic acids. The presence of any coupling residues in the polymer may be ignored for an adequate description of the polymers forming a part of the compositions of this invention. Likewise, in the generic sense, the specific structures also may be ignored. The invention applies especially to the use of selectively hydrogenated polymers having the configuration before hydrogenation of the following typical species:

polystyrene-polybutadiene-polystyrene (SBS)
polystyrene-polyisoprene-polystyrene (SIS)
poly(alpha-methylstyrene)-polybutadiene-poly(alpha-methylstyrene) and
poly(alpha-methylstyrene)-polyisoprene-poly(alpha-methylstyrene)

It will be understood that both blocks A and B may be either homopolymer, random, or tapered copolymer blocks as long as each block predominates in at least one class of the monomers characterizing the blocks and as long as the A blocks individually predominate in monoalkenyl arenes and the B blocks individually predominate in dienes. The term "monoalkenyl arene" will be taken to include especially styrene and its analogs and homologs including alpha-methylstyrene and ring-substituted styrenes, particularly ring-methylated styrenes. The preferred monoalkenyl arenes are styrene and alpha-methylstyrene, and styrene is particularly preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 55 mol percent of the condense butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of ethylene and propylene (EP).

Hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

The average molecular weights of the individual blocks may vary within certain limits. In most instances, the monoalkenyl arene blocks will have number average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 350,000, preferably from about 35,000 to about 300,000. These molecular weights are most accurately determined by tritium counting methods or osmotic pressure measurement.

The proportion of the monoalkenyl arene blocks should be between about 8 and 55% by weight of the block copolymer, preferably between about 10 and 35% by weight.

The polymeric alpha-olefin component is preferably isotactic polypropylene, which is an essentially crystalline polypropylene. The solid isotactic polypropylene has weight average molecular weight of between about 200,000 and about 300,000, preferably between about 225,000 and about 275,000. The amount of polymeric alpha-olefin employed typically varies from about 5 pbw to about 200 pbw (parts by weight), preferably about 50 to about 150 pbw.

Examples of various fillers and reinforcements that can be employed are listed in the 1971–1972 Modern Plastics Encyclopedia, pages 240–247. Specific examples of fillers include clay, talc, titanium dioxide, carbon blacks, calcium carbonate, and other pigments as well as fibrous fillers such as cellulosic fibers, saw dust, ground cork, etc. Preferred fillers include talc, $CaCO_3$ and carbon black. The amount of fillers employed varies from about 5 to about 200 pbw, preferably about 20 to about 100 pbw.

The next component is a synthetic rubberizing polymer which acts as a softening agent or rubberizing compound. Preferably, the synthetic rubberizing polymer is selected from the group consisting of non-hydrogenated monoalkenyl arene-conjugated diene multi-block copolymers, selectively hydrogenated monoalkenyl arene-conjugated diene A-B two block copolymer, ethylene-propylene copolymers; EPDM-type terpolymers; polyisobutylene, butyl rubber, polybutadiene and neoprene. More preferably, the synthetic rubberizing compound is the A-B two block copolymer.

The first member of the above group is the non-hydrogenated version of the multi-block copolymer hereinabove defined.

The second polymer in this group is a selectively hydrogenated monoalkenyl arene-conjugated diene two block copolymer having the structure A-B where the A and B blocks are defined as above. The weight ratio of A to B varies from about 5:95 to about 90:10, preferably about 20:80 to about 60:40. The third polymer in the group is an ethylene-propylene copolymer. The EP copolymers employed herein refer to amorphous copolymers derived essentially from ethylene and propylene, however, such copolymers may contain minor amounts, i.e. up to 10 percent, based on the molar amounts of the monomeric ethylene and propylene units in the copolymer, of polymerized units derived from other olefin monomers. Such other olefin monomers include olefins of the general formula $RCH=CH_2$, in which R is an aliphatic or cycloaliphatic radical of from 2 to about 20 carbon atoms, for example, butene-1, hexene-1, 4-methyl-1-pentene, decene-1, etc. Suitable ethylene-propylene copolymers contain from about 30 to about 65, preferably from about 35 to about 45 mole percent propylene, and have a number average molecular weight of between about 70,000 and about 300,000, preferably between about 80,000 and about 200,000. It is also preferred that the ethylene-propylene copolymer contain at least 150 pendant methyl groups per 1,000 chain carbon atoms. Methods of preparation of these copolymers are well known, and are described in the United States Patents listed in U.S. Pat. No. 3,864,268. The fourth polymer in the group is a terpolymer. Useful terpolymers for this invention comprise ethylene, a $C_3$ to $C_8$ straight or branched chain alpha-olefin and a diene. Representative non-limiting examples of non-conjugated dienes that may be used as the third monomer in the terpolymer include:

(a) Straight chain acyclic dienes such as: 1,4-hexadiene; 1,5-heptadiene, 1,6-octadiene.

(b) Branched chain acyclic dienes such as: 5-methyl-1,4-hexadiene; 3,7-dimethyl 1,6-octadiene; 3,7-dimethyl 1,7-octadiene; and the mixed isomers of dihydro-myrcene and dihydroocimene.

(c) Single ring alicyclic dienes such as: 1,4-cyclohexadiene; 1,5-cyclooctadiene; 1,5-cyclododecadiene, 4-vinylcyclohexene; 1-allyl,4-isopropylidene cyclohexane; 3-allyl-cyclopentene; 4-allyl cyclohexene and 1-isopropenyl 4-(4-butenyl) cyclohexane.

(d) Multi single ring alicyclic dienes such as: 4,4'-dicyclopentenyl and 4,4'-dicyclohexenyl dienes.

(e) Multi-ring alicyclic fused and bridged ring dienes such as: tetrahydroindene; methyl tetrahydroindene; dicyclopentadiene; bicyclo(2.2.1) hepta 2,5-diene; alkenyl, alkylidene,, cycloalkenyl and cycloalkylidene norbornenes such as: 5-methylene-6-methyl-2-norbornene; 5-methylene-6,6-dimethyl-2-norbornene; 5-propenyl-2-norbornene; 5-(3-cyclopentenyl)-2-norbornene and 5-cyclohexyldene-2-norbornene.

In general, useful terpolymers contain non-conjugated dienes having 5 to 14 carbon atoms and exhibit weight average molecular weights of from 70,000 to 1,000,000 e.g., 70,000 to 150,000. Preferred dienes include ethylidene norbornene, dicyclopentadiene and 1,4 hexadiene. Structurally, the terpolymers suitable for the present invention may be illustrated for various non-conjugated diene monomers as random terpolymers in which the following moieties are linked in the polymer chain in a random sequence and in a varying number.

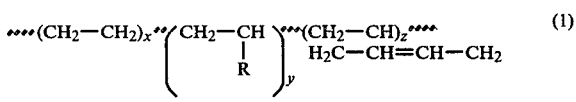

Ethylene units | Higher α-olefin units | 1,4-hexadiene units  (1)

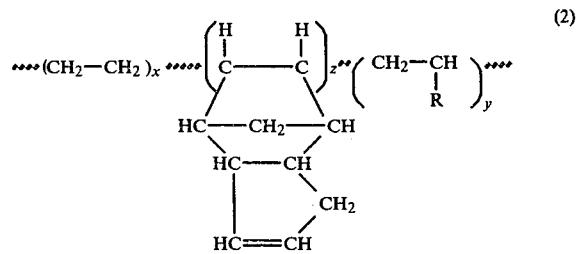

Ethylene units | Dicyclopentadiene units | Higher -α- olefin units  (2)

-continued

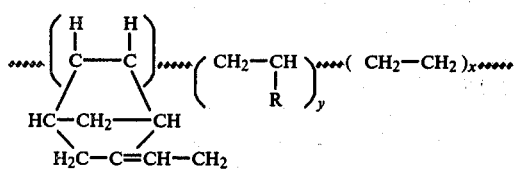

5-ethylidene-2-nor-bornene    Higher -α-olefin units    Ethylene units in which x, y and z are cardinal numbers. While these terpolymers are essentially amorphous in character by superficial inspection, they may contain up to about 25 percent by weight of crystalline segments as determined by X-ray or differential scanning calorimetry. Details of these methods for measurement of crystallinity are found in J. Polymer Science, A-2, 9, 127 (1971) by G. Ver Strate and Z. W. Wilchinsky. Terpolymers, useful in the present invention contain at least 30 mol. percent, preferably not more than 85 mol. percent of ethylene; between about 15 and about 70 mol. percent of a higher alphaolefin or mixture thereof, preferably propylene; and between 1 and 20 mol. percent, preferably 1 to 15 mol. percent, of a non-conjugated diene or mixture thereof. Especially preferred are polymers of about 40 to 70 mol. percent ethylene, 20 to 58 percent higher monoolefin and 2 to 10 mol. percent diene. On a weight basis, usually the diene will be at least 2 or 3 wt. percent of the total terpolymer. The fifth and sixth members of this group are isobutylene polymers including solid polyisobutylene and butyl rubber. Butyl rubber is a high molecular weight copolymer of isobutylene with less than 20 percent, preferably less than 5 percent of one or more $C_4$-$C_{14}$ diolefins such as isoprene, divinyl benzene and pentadiene-1,4. See generally U.S. Pat. No. 3,137,643. The seventh member is high molecular weight synthetic polybutadiene such as that described in U.S. Pat. No. 3,317,918. Another synthetic rubberizing polymer is neoprene. These neoprene rubbers are typically produced from the polymerization of chloroprene (2-chloro-1,3-butadiene) and those copolymers produced by the polymerization of chloroprene and a constituent selected from the group consisting of styrene, isoprene, and acrylonitrile wherein the major component of the said produced copolymer is chloroprene. A chloroprene polymer can conventionally be produced by emulsifying the chloroprene in water by means of a sodium rosinate soap and polymerizing the chloroprene at 40° C. with the aid of potassium persulfate as a catalyst and in the presence of elemental sulfur as a modifier. Other similar polymers may be employed as the synthetic rubberizing polymer.

The amount of synthetic rubberizing polymer employed is between about 5 and about 200 pbw, preferably between about 25 and about 100 pbw.

The fatty acid amide is added to aid in mold release characteristics. Fatty acid amides useful in these compositions include the following as listed in U.S. Pat. No. 3,515,528:
Erucamide
Hexadecanamide (palmitamide)
Octadecanamide (stearamide)
9-octadecenamide (olemeadide)
9,12-octadecadienamide (linoleamide)
Arachidamide
Behenamide
Ligonoceramide
Licanamide Mixtures of these fatty acid amides may be utilized and normally the products commercially available will constitute mixtures wherein one of the predominating components is one of the above species while other species from the above list may be present in minor amounts. Furthermore, other amides may be utilized in minor amounts such as rosin acid amides and the like, as well as polyamides of polyethylene diamines and the like wherein the amide radical thereof is derived from a high molecular weight fatty acid. Erucamide is a much preferred fatty acid amide. The amount of fatty acid amide added is between about 0.5 and about 15.0 pbw, preferably between about 2.0 and about 10.0 pbw.

The various components may be combined in any suitable manner including solution blending, melt blending and dry blending. The compositions may then suitably be employed as various automobile parts and the like. See generally U.S. Pat. No. 3,850,474, for examples of various end-use applications. In addition, non-automotive applications are also contemplated.

The polymer blends of the instant invention may be compounded further with other polymers, oils, fillers, reinforcements, antioxidants, stabilizers, fire retardants, antiblocking agents and other rubber and plastic compounding ingredients without departing from the scope of this invention.

To illustrate the present invention, the following illustrative embodiments are given. It is to be understood, however, that the embodiments are given for the purpose of illustration only and the invention is not to be regarded as limited to any of the specific materials or conditions used in the specific embodiments.

ILLUSTRATIVE EMBODIMENT I

In Illustrative Embodiment I, various blends were prepared by mixing all components except erucamide on a Werner-Pfleiderer compounding extruder at a temperature of about 200° C. The multiblock copolymer was a three block selectively hydrogenated SBS copolymer and the two block copolymer was a selectively hydrogenated SI copolymer. The blends were then tumbled with erucamide and injected molded into plaques. The various formulations and mold release characteristics are listed below in Table I.

Table I

| Run Number | CS-1995 | CS-1996 | CS-1997 |
|---|---|---|---|
| Components, Parts by Weight | | | |
| Multi-block copolymer | 100 | 100 | 100 |
| Two block copolymer | 50 | 50 | 50 |
| Polypropylene | 100 | 100 | 100 |
| Talc filler | 25 | 25 | 25 |
| TiO$_2$ | 2.0 | 2.0 | 2.0 |
| Black pigment concentrate | 0.4 | 0.4 | 0.4 |
| Additive package | 1.7 | 1.7 | 1.7 |
| Erucamide | 0 | 1.4 | 2.8 |
| Mold Release Characteristics | | | |
| Sprues stick | yes | yes | no |
| Percent of sticking sprues | 90 | 50 | 0 |
| Comments | very hard to remove sprues | sprues removed easily | no release problem, sprues feel slick |

A primary concern when using a release agent in automotive products is its effect upon the performance of a finished decorated article. To evaluate this concern, all of the above compositions were painted within 24 hours of injection molding and after an interval of two weeks. Surprisingly, all plaques exhibited 100% paint adhesion before and after extensive water immersion tests.

ILLUSTRATIVE EMBODIMENT II

In Illustrative Embodiment II a composition containing 1.6 pbw erucamide was prepared. This composition mainly differed from CS-1995 in that the talc content was increased to 50 pbw to enhance product heat dissipation and the erucamide was added prior to compound mixing. When fabricated into finished automobile fenders, this blend showed excellent mold release and excellent paintability. Paint adhesion was maintained throughout water immersion and Florida weathering tests.

What we claim is:

1. A composition comprising the admixture obtained by mixing:
   (a) 100 parts by weight of a selectively hydrogenated monoalkenyl arene-conjugated diene multiblock copolymer;
   (b) 5 to 200 parts by weight of a polymeric alpha-olefin;
   (c) 5 to 200 parts by weight of a filler;
   (d) 5 to 200 parts by weight of a synthetic rubberizing polymer; and
   (e) 0.05 to about 15.0 parts by weight of a fatty acid amide
wherein said rubberizing polymer is selected from the group consisting of non-hydrogenated monoalkenyl arene-conjugated diene multi-block copolymers; selectively hydrogenated monoalkenyl arene-conjugated diene A'-B' two block copolymers; ethylene-propylene copolymers; EPDM-type terpolymers; polyisobutylene; butyl rubber; polybutadiene and neoprene.

2. A composition according to claim 1 wherein said multiblock block copolymer comprises at least two monoalkenyl arene polymer end blocks A and at least one substantially completely hydrogenated conjugated diene mid block B, said block copolymer having an 8 to 55 percent by weight monoalkenyl arene polymer block content, each polymer block A having an average molecular weight of between about 5,000 and about 125,000, and each polymer block B having an average molecular weight of between about 10,000 and about 300,000.

3. A composition according to claim 1 wherein said rubberizing polymer is a block copolymer having the structure A'—B' where A' is a monoalkenyl arene polymer block having an average molecular weight of between about 5,000 and about 125,000 and B' is a substantially completely hydrogenated conjugated diene polymer block having an average molecular weight of between about 10,000 and about 300,000.

4. A composition according to claim 1 wherein said rubberizing polymer is an ethylene-propylene copolymer having a number average molecular weight of between about 70,000 and about 300,000 and comprising essentially ethylene, from about 30 to about 65 mole percent propylene, and less than about 10 mole percent of an alpha-olefin of the general formula $RCH=CH_2$, where R is an aliphatic or cycloaliphatic radical of from 2 to about 20 carbon atoms.

5. A composition according to claim 1 wherein said rubberizing polymer is a terpolymer having a molecular weight of between about 70,000 and 150,000 and comprising about 30 to 85 mole percent ethylene, about 15 to 70 mole percent of a $C_3$ to $C_8$ alpha monoolefin and about 1 to about 20 mole percent of a $C_5$ to $C_{14}$ non-conjugated diene.

6. A composition according to claim 1 wherein said fatty acid amide is an erucamide.

7. A composition according to claim 1 wherein said filler is talc.

8. A composition according to claim 1 wherein the amount of said fatty acid amide is greater than 2 parts by weight.

9. An automobile part molded from the composition of claim 1.

10. A composition comprising the admixture obtained by mixing:
   (a) 100 parts by weight of a selectively hyrogenated monoalkenyl arene-conjugated diene multiblock copolymer;
   (b) 5 to 200 parts by weight of a polymeric alpha-olefin;
   (c) 5 to 200 parts by weight of a filler;
   (d) 5 to 200 parts by weight of a synthetic rubberizing polymer; and
   (e) 0.05 to about 15.0 parts by weight of a fatty acid amide
wherein said rubberizing polymer is selected from the group consisting of
   (i) a block copolymer having the structure A'—B' where A' is a monoalkenyl arene polymer block having an average molecular weight of between about 5,000 and about 125,000 and B' is a substantially completely hydrogenated conjugated diene polymer block having an average molecular weight of between about 10,000 and about 300,000;
   (ii) an ethylene-propylene copolymer having a number average molecular weight of between about 70,000 and about 300,000 and comprising essentially ethylene, from about 30 to about 65 mole percent propylene, and less than about 10 mole percent of alpha-olefin of the general formula $RCH=CH_2$, where R is an aliphatic or cycloaliphatic radical of from 2 to about 20 carbon atoms; and
   (iii) a terpolymer having a molecular weight of between about 70,000 and 150,000 and comprising about 30 to 85 mole percent ethylene, about 15 to 70 mole percent of a $C_3$ to $C_8$ alpha monoolefin and about 1 to about 20 mole percent of a $C_5$ to $C_{14}$ non-conjugated diene.

* * * * *